United States Patent
Zeineh et al.

(10) Patent No.: US 7,456,377 B2
(45) Date of Patent: Nov. 25, 2008

(54) SYSTEM AND METHOD FOR CREATING MAGNIFIED IMAGES OF A MICROSCOPE SLIDE

(75) Inventors: Jack A. Zeineh, Fullerton, CA (US); Rui-Tao Dong, Mission Viejo, CA (US)

(73) Assignee: Carl Zeiss MicroImaging AIS, Inc., Thornwood, NY (US)

( * ) Notice: Subject to any disclaimer, the term of this patent is extended or adjusted under 35 U.S.C. 154(b) by 531 days.

(21) Appl. No.: 11/211,405

(22) Filed: Aug. 25, 2005

(65) Prior Publication Data

US 2006/0045505 A1 Mar. 2, 2006

Related U.S. Application Data

(60) Provisional application No. 60/609,961, filed on Sep. 15, 2004, provisional application No. 60/605,835, filed on Aug. 31, 2004.

(51) Int. Cl.
*G02B 7/04* (2006.01)
(52) U.S. Cl. .................. 250/201.3; 250/208.1
(58) Field of Classification Search .............. 250/201.3, 250/201.2, 201.8, 208.1, 306, 307; 382/128–134, 382/173, 270–276, 284, 312; 348/77–79
See application file for complete search history.

(56) References Cited

U.S. PATENT DOCUMENTS

| | | | |
|---|---|---|---|
| 5,659,489 A | 8/1997 | Baldur | |
| 5,991,461 A | 11/1999 | Schmucker et al. | |
| 6,005,964 A * | 12/1999 | Reid et al. | 382/133 |
| 6,084,988 A | 7/2000 | Kanno et al. | |
| 6,101,265 A | 8/2000 | Bacus et al. | |
| 6,528,787 B2 | 3/2003 | Katagami et al. | |
| 6,687,419 B1 | 2/2004 | Atkin | |
| 2002/0039434 A1 | 4/2002 | Levin et al. | |
| 2003/0210262 A1 | 11/2003 | Gahm et al. | |
| 2004/0114218 A1 | 6/2004 | Karlsson et al. | |
| 2005/0084175 A1 | 4/2005 | Olszak | |

OTHER PUBLICATIONS

Fisher et al., Image Analysis - Connected Components Labeling, http://homepages.inf.ed.ac.uk/rbf/HIPR2/label.htm, ©2003, print date of Aug. 30, 2004, 8 pages.
Fisher et al., Connected Components Labeling, Internet Archive Wayback Machines, http://web.archive.org/web/20040807020507/http://www.cee.hw.ac.uk/hipr/html/label.html, ©1994, Internet Archive Wayback machine date of Aug. 7, 2004, 5 pages.

* cited by examiner

*Primary Examiner*—Que T Le
(74) *Attorney, Agent, or Firm*—Patterson, Thuente, Skaar & Christensen, P.A.

(57) ABSTRACT

A method and system for creating a digital, virtual slide having optimum image quality characteristics. Multiple regions of a physical slide are identified as well as at least two focus z-positions z1, and z2. Each region of the physical slide is scanned (imaged) at the first z position, so as to produce a first set of digital images of each defined region. Each region of the physical slide is also scanned (imaged) at the second z position, so as to produce a second set of digital images of each defined region. Each image of each set is evaluated against a focus quality metric and, for each region, either the first or second image, corresponding to that region, is selected that exhibits a focus quality metric corresponding to a desired focus quality. These images are then merged into a digital virtual slide. Additional focus z-positions may be included, and the multiple z-positions may be scanned seriatim, sequentially, and/or in overlapping fashion.

23 Claims, 6 Drawing Sheets

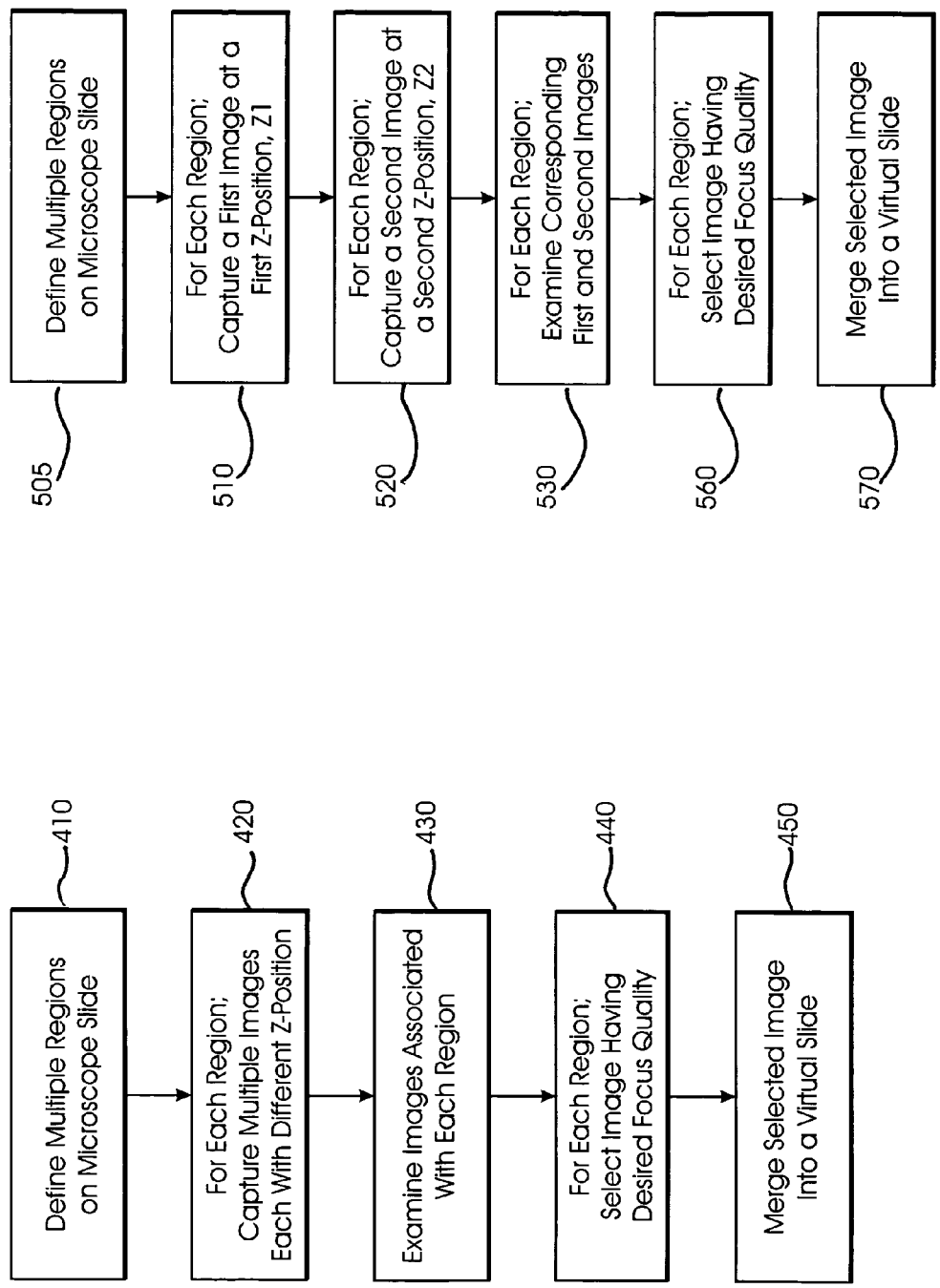

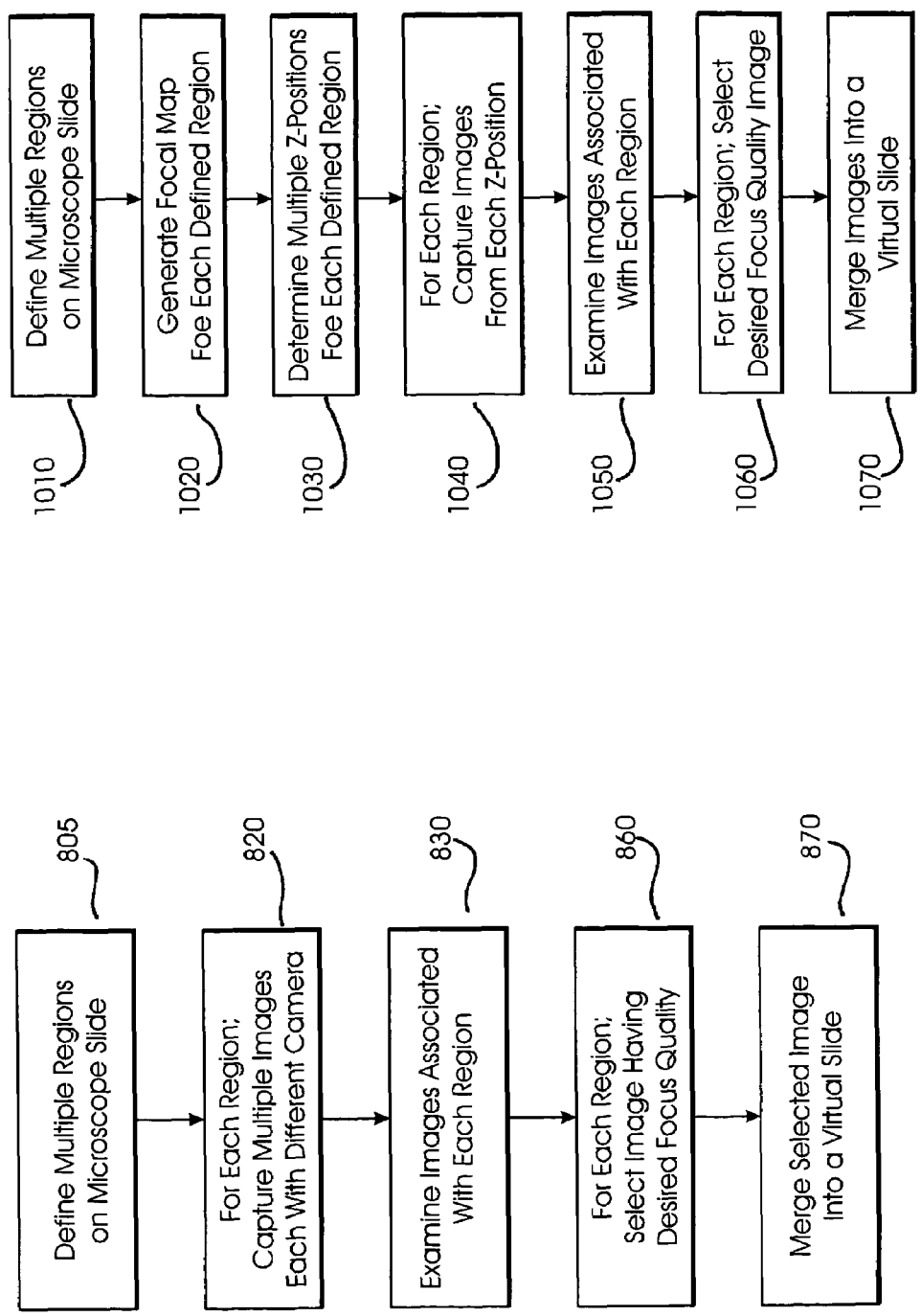

SYSTEM AND METHOD FOR CREATING MAGNIFIED IMAGES OF A MICROSCOPE SLIDE

CROSS REFERENCE TO RELATED APPLICATIONS

The present application is related to and takes priority from U.S. Provisional Applications Ser. Nos. 60/605,835, and 60/609,961, filed Aug. 31, 2004 and Sep. 15, 2004, respectively, and is further related to co-pending U.S. patent application Ser. No. 11/218,073, filed Aug. 31, 2005 entitled SYSTEMS AND METHODS FOR STITCHING IMAGE BLOCKS TO CREATE SEAMLESS MAGNIFIED IMAGES OF A MICROSCOPE SLIDE, all commonly owned by the assignee of the present application, the entire contents of which are expressly incorporated herein by reference.

FIELD OF THE INVENTION

The invention relates generally to a system and method for obtaining image data for use in creating virtual microscope slides, and more particularly, to a method and system for obtaining magnified images of a microscope slide.

BACKGROUND OF THE INVENTION

A virtual microscope slide typically comprises digital data representing a magnified image of a microscope slide. Because the virtual slide is in digital form, it can be stored on a medium, such as in a computer memory, and can be transmitted over a communication network, such as the Internet, an intranet, etc., to a viewer at a remote location.

Virtual slides offer significant advantages over traditional microscope slides. In some cases, a virtual slide can enable a physician to render a diagnosis more quickly, conveniently and economically than is possible using traditional microscope slides. For example, a virtual slide may be made available to a remote user, such as a specialist in a remote location, over a communication link, enabling the physician to consult with the specialist and arrive at a more comprehensive diagnosis without the normally attendant delays associated with consultation. Alternatively, the virtual slide can be stored in digital form indefinitely, for later viewing at the convenience of the physician or specialist.

Typically, a virtual slide is generated by positioning a microscope slide (which contains a sample for which a magnified image is desired) under a microscope objective lens, capturing one or more images covering all, or a portion, of the slide, and then combining the images to create a single, integrated, digital image of the slide. It is often desirable to divide a slide into multiple regions and generate a separate image for each region. This is because, in many cases, an entire slide is often larger than the field of view of a high-power objective lens (a 20× objective, for example) and multiple images must be obtained in order to render the entire slide image at the desired 20× magnification. Additionally, the surfaces of many tissue types are uneven and contain local variations that make it difficult to capture an in-focus image of an entire slide using a fixed vertical, or z-position. As used herein, the term z-position refers the coordinate value of the z-axis of a Cartesian coordinate system. The x and y axes lie in the plane in which the stage resides. Accordingly, existing techniques typically obtain multiple images representing various regions on a slide, and combine the multiple images into an integrated image of the entire slide.

One current technique for capturing digital images of a microscopic slide is known as the start/stop acquisition method. According to this technique, multiple target points on a slide are designated for examination. A high-power objective lens (a 20× objective, for example) is positioned over the slide. At each target point, the z-position is varied and images are captured from multiple z-positions. The images are then examined to determine a desired-focus position. If one of the images obtained during the focusing operation is determined to be sufficiently in focus, it is selected as the desired-focus image for the respective target point on the slide. If none of the images is in-focus, the images are analyzed to determine a desired-focus position, the objective lens is moved to the desired-focus position, and a new image is captured. In some cases, a first sequence of images does not provide sufficient information to determine a desired focus position. In such event, it may be necessary to capture a second sequence of images within a narrowed range of z-positions before a desired-focus image is acquired. The multiple desired focus images (one for each target point) obtained in this manner may be combined to create a virtual slide.

Another approach used to generate in-focus images for developing a virtual slide includes examining the microscope slide to generate a focal map, which is an estimated focus surface created by focusing a (high-power) scanning objective lens on a limited number of points on the slide. Then, a scanning operation is performed based on the focal map. Current techniques construct focal maps by determining desired-focus information for a limited number of points on a slide. For example, such systems may select from 10 to 20 target points on a slide and use a high-power objective lens to perform a focus operation at each target point in order to determine a desired-focus position. The information obtained for those target points is then used to estimate desired-focus information for any unexamined points on the slide.

Existing start/stop acquisition systems, as described above, are relatively slow because the microscope objective lens is often required to perform multiple focus-capture operations for each designated target point on the microscopic slide. In addition, the field of view of high-power objective lenses is necessarily limited; therefore, the number of points for which desired-focus information is directly obtained may represent a relatively small portion of the entire slide.

Existing techniques for constructing focal maps also have several disadvantages. First, as described above, the use of a high-power objective lens to obtain desired-focus data for a given target point is relatively slow. Second, generating a focal map from a limited number of points on the slide can create inaccuracies in the resulting focal map. Tissue on a slide often does not have a uniform, smooth surface. Indeed, many tissue surfaces contain variations that vary across small distances (termed field-to-field variation). If a point on the surface of the tissue that has a defect or a significant local variation is selected as a target point for obtaining focus information, the local deviation can affect estimated values for desired-focus positions throughout the entire focal map. Intra-field variations can also cause focus information to be inaccurate. Even when the focus information is accurate, the mechanical nature of the microscope apparatus can cause a scan to produce an out-of-focus image due to mechanical problems; such as small motions or vibrations of the apparatus, incorrect calibration, etc. This is particularly true in the case of high-power objective lens scanning.

In yet another technique, multiple regions are defined on a microscope slide, and a focal map containing focus information for each region is generated. For each region, a plurality of z-positions are determined based on the focus information in the focal map. For each region, at least one image is captured from each of the associated z-positions. An image of each region having a desired focus quality is selected, and the selected images are combined to generate a virtual slide.

SUMMARY OF THE INVENTION

The invention is directed, generally, to a microscopy system for scanning physical sample slides, the physical slides moveable through a microscope optical field of view and focusable through a z position, and relates particularly to a method for creating a digital, virtual slide having optimum image quality characteristics. The method comprises the identification of multiple regions for each physical slide and the definition of at least two focus z positions $z1$, and $z2$. Each region of the physical slide is scanned (imaged) at the first z position, so as to produce a first set of digital images of each defined region. Each region of the physical slide is also scanned (imaged) at the second z position, so as to produce a second set of digital images of each defined region. Each image of each set is evaluated against a focus quality metric and, for each region, either the first or second image, corresponding to that region, is selected that exhibits a focus quality metric corresponding to a desired focus quality.

In a particular aspect of the invention, the scanning steps are performed sequentially for each defined region, each region being imaged at the first z position $z1$ and then at the second z position $z2$. Alternatively, the scanning steps are performed seriatim for all defined regions, all defined regions being imaged sequentially at the first z position $z1$ and then imaged sequentially at the second z position $z2$.

In yet another novel aspect, the z position focus defining step further comprises the steps of determining a nominal in-focus z position for a sample slide, adjusting the nominal z position, in a first direction, by a first z position off-set, adjusting the nominal z position, in an opposite direction, by a second z position off-set, and defining the first and second adjusted z positions as the two focus z positions $z1$, and $z2$. The nominal in-focus z position for a sample slide may be determined from a focus map, or may be determined empirically. Additionally, the first z position off-set may be equal or unequal to the second z position off-set, and may, therefore, be either larger or smaller than the second z position off-set. Specifically, the first and second offsets are suitably within a depth of field of an objective lens of the microscopy system.

In a further aspect of the invention, the scanning steps are performed simultaneously for each defined region, each region being imaged at the first z position $z1$ and at the second z position $z2$ simultaneously. The method suitably entails providing a plurality of digital imaging devices, the plurality coupled to the microscopy system so as to capture multiple images of the optical field of view, the images differing from one another by their focus z positions. A portion of the physical slide, presented to the optical field of view, is simultaneously images by all the devices of the plurality.

Suitably, each of the plurality of digital imaging devices captures an image of the same portion of the physical slide. Alternatively, the field of view of each of the plurality of digital imaging devices is disposed along a translational direction such that each of the plurality of digital imaging devices captures an image of a next, sequential portion of the physical slide. The microscopy system translates the physical slide along the field of view of the imaging devices a distance corresponding to a defined portion of an imaging device field of view. Specifically, an imaging device may have a field of view with a width dimension W; the microscopy system translates the physical slide a distance W/2, so as to generate multiple sequential images overlapping one another by W/2.

Yet a further aspect of the invention is characterized in a microscopy system of the type in which physical material sample slides are supported for viewing and image capture, the physical slides moveable through a microscope optical field of view and focusable through a z position. A method for creating a digital, virtual slide having optimum image quality characteristics comprises defining multiple regions for each physical slide. The physical slide is scanned (imaged) at a first z position, so as to produce a first set of digital images of each defined region having a first focus quality metric. The physical slide is scanned (imaged) at a second z position, so as to produce a second set digital images of each defined region having a second focus quality metric. Each image of each set is evaluated against a focus quality metric, and, for each region, either the first or second image, corresponding to that region, having a focus quality metric corresponding to a desired focus quality is selected. The selected one of each set of images is identified as the chosen image of a corresponding region, and the identified regional images are merged into a composite image, the composite image defining the virtual slide. Characteristically, the focus quality metric evaluation step is performed by application software residing on a control processor. The control processor evaluates the focus quality metric evaluation by measuring an image characteristic selected from the group consisting of overall image entropy, image texture energy, image contrast, and feature edge sharpness.

In a microscopy system of the type in which physical material sample slides are supported for viewing and image capture, the physical slides moveable through a microscope optical field of view along x and y positions and focusable through a z position, another aspect of the invention is implemented as a method for creating a digital, virtual slide having optimum image quality characteristics. The method comprises defining multiple regions for each physical slide, each region having an area characterized at least by a width dimension W. An image of a first defined region is captured, wherein the microscope is positioned, relative to the physical slide, at a first z position $z1$. The physical slide is moved along a translational axis through the microscope optical field of view a distance equal to one-half a regional width dimension (W/2). The position of the microscope is adjusted to a second z position $z2$ and an image of the physical slide so presented to the optical field of view is captured.

The physical slide is again moved in the same direction along the translational axis through the microscope optical field of view a distance equal to one-half a regional width dimension (W/2), and the z position of the microscope is returned to the first z position $z1$. An image of a second defined region is captured, wherein the microscope is positioned at the first z position $z1$, and the steps of adjusting, capturing, moving W/2, returning, capturing and moving W/2 are repeated until the physical slide is fully scanned.

BRIEF DESCRIPTION OF THE DRAWINGS

These and other features, aspects, and advantages of the present invention will be more apparent when considered in connection with the following specification, appended claims and accompanying drawings, wherein:

FIG. 2 is a flowchart of an example of a method for generating images of a microscope slide, in accordance with an embodiment;

FIG. 3 is a flowchart of an example of a method for using an area sensor to obtain images of a microscope slide, in accordance with an embodiment;

FIG. 8 is a flowchart of an example of a method for using a multiple-camera apparatus to obtain images of a microscope slide, in accordance with an embodiment;

FIG. 9 is a flowchart of an example of a method for using a multi plane focal surface to generate images of a microscope slide, in accordance with an embodiment.

DETAILED DESCRIPTION OF THE EMBODIMENTS OF THE INVENTION

Figure 1:
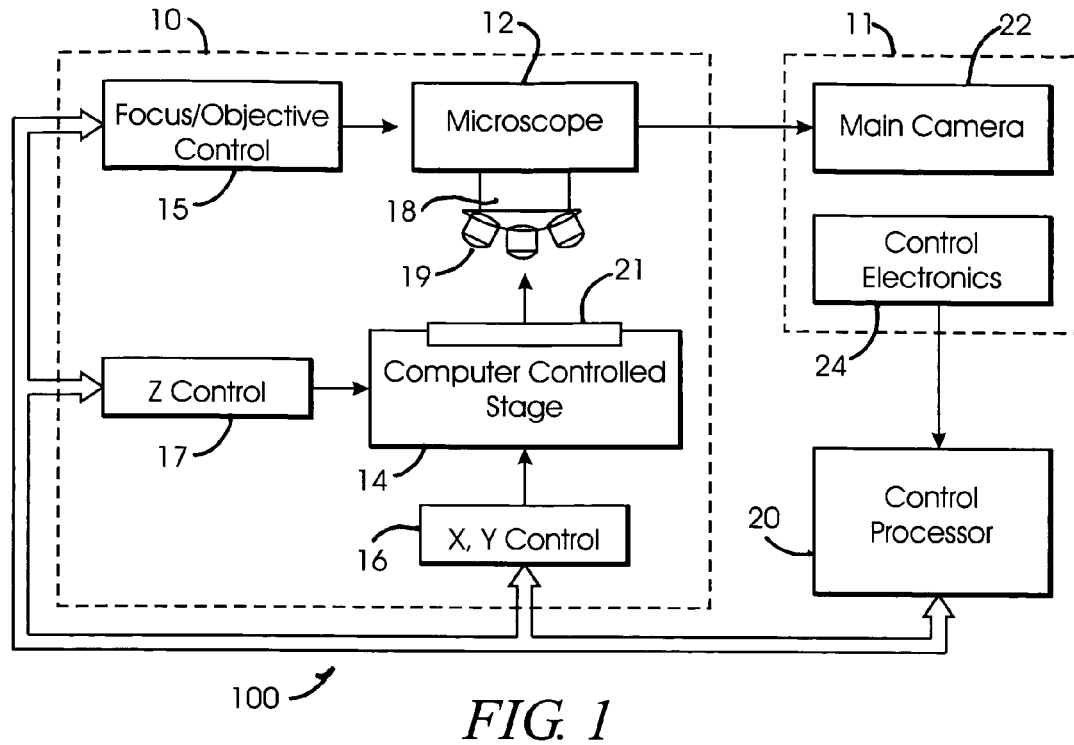
FIG. 1 is a simplified block diagram of an example of an imaging system that may be used to obtain images of a microscope slide, in accordance with an embodiment.

A virtual microscope slide typically comprises digital data representing a magnified image of all, or a portion of, a microscope slide. Because the virtual slide is in digital form, it can easily be stored on a digital storage medium, such as in the form of an image file in a computer memory, or on a disk drive, a CD ROM, or the like, and can easily be transmitted as a digital file over a communication network, such as the Internet, an intranet, etc., to a suitable viewer at a remote location.

The various embodiments, described herein, provide improved systems and methods for obtaining in-focus images of desired portions of a microscope slide and further provide improved systems and methods for combining the in-focus images in order to create a complete virtual slide. In one aspect of a an exemplary embodiment of the invention, multiple regions of a microscope slide are defined, multiple images of each region are captured and, for each defined region, an image having a desired focus quality is selected from the multiplicity of captured images. The selected images are merged, on a region-by-region basis, to generate a virtual slide.

In the exemplary embodiment, multiple regions on a microscope slide are defined. These might be defined in terms of particular, sequential areas of the slide, such as sequential stripes, a mosaic pattern of defined squares or rectangles, or some similar designation. A plurality of z-positions are determined and the designated areas of the microscope slide are scanned from each z-position. During each scan, at least one image of each defined region is obtained. As a result, multiple images of each defined region are generated (each image representing a different z-position). For each region, the associated set of z-position images is examined and a particular one of the z-position images, that one having a desired focus quality, is selected.

The selected regional images are then combined in order to generate a complete virtual slide. As mentioned above, the actual regional selection technique is not particularly germane to practice of the invention. Indeed, an area scanner or a line scanner, operating in a horizontal or vertical raster-scan mode, vector scan, or the like, may be used to determine the multiple regions. The particular scan technique is not important, so long as slide scanning is performed along a known, reproducible path, and the defined slide areas are index able for eventual recombination.

In an alternative exemplary embodiment, multiple regions are again defined on a microscope slide. An image of a first region on the microscope slide is captured from a first z-position. The microscope objective lens is then moved along the z-axis to a second z-position and along the x axis to a position encompassing one or more points located in the first region and one or more points in a second defined region. A multi-region image is captured from the second z-position, which might be considered as a partial overlap of the first and second regions. The microscope objective lens is then moved along the z-axis back to the first z-position and in the x-direction to a position above the second field. An image of the second region is then captured from the first z-position. This procedure is repeated to capture multiple images of a desired number of regions on the microscope slide, with each region portion being represented by at least two z-position images.

With regard now to the figures, FIG. 1 is a simplified block diagram of an imaging system, identified generally at 100, that may be used to obtain suitable magnified images of a microscope slide, in accordance with practice of the principles of the invention. The system 100 suitably comprises a motorized microscopy system 10, a camera or image acquisition system 11, and a control processor 20.

The motorized microscopy system 10 includes a microscope 12, such as a laboratory or research grade microscope, in turn comprising at least one rotatable objective turret 18. In accord with accepted practice, the objective turret might be provided as a single, double, triple, quadruple or quintuple inverted objective turret. As such, each turret comprises at least one objective lens 19 mounted in conventional fashion on the turret. The microscopy system 10 further includes a computer controlled microscope stage 14, which supports a slide 21. The microscope stage 14 is movable in the x, y, and z directions and is robotic ally controllable by mechanically coupling x, y, and z translation motors to the stage platform through a control system, referred to herein as x, y control 16 and z control 17. A suitable illumination source (not shown) is disposed beneath stage 14 and is also capable of translational movement beneath the stage in order to shift the apparent illumination source with respect to a specimen on the microscope stage 14. Both the translational motion of stage 14 and the intensity of the illumination source are controllable by a software program operating as a software or firmware program application on a control processor 20, for example. A condenser lens (not shown) collects light produced by the illumination source and directs it toward the sample.

Rotation of the objective turret 18 moves a desired one of perhaps multiple objective lenses 19 into the optical path of the microscope such that a magnified image of the specimen is generated. In the exemplary embodiment of FIG. 1, two objective lenses 19 are provided. For purposes of illustration, it will be assumed that these objectives include a 4× objective lens and a 20× objective lens. Examples of robotically controlled microscopy systems suitable for use in connection with the present invention include the Olympus BX microscope system equipped with a Prior H101 remotely controllable stage. The Olympus BX microscope system is manufactured and sold by Olympus America Inc., Melville, N.Y. The Prior H101 stage is manufactured and sold by Prior Scientific Inc., Rockland, Mass. Other similar computerized stages may be used, such as those manufactured and sold by Ludl Electronics Products Ltd., Hawthorne, N.Y.

If the objective turret 18 of the microscope is a multiple objective system, and is populated with multiple objective lenses 19, a focus/objective control system 15, comprising a robotically controllable motor and motor driver combination, coupled to the objective turret may be suitably provided in order to rotate the turret to bring various desired objective lenses 19 into the optical path. Upon receipt of an appropriate movement command signal, the focus/objective control system 15 directs the motor to rotate the turret within a rotatable frame, thereby moving a different objective lens 19 into the optical path of the microscope system.

In one example, the x, y control 16 comprises motors for controlling stage 14 in the x, y, and z directions, along with appropriate motor driver circuitry for actuating the motors. As used herein, the x and y directions refer to vectors in the plane in which the stage 14 resides. The mechanical apparatus and electronic control circuitry for effecting stage movement are preferably implemented to include some form of open or closed-loop motor positioning servo system such that stage 14 can be either positioned with great precision, or its translational movement can be determined very accurately in the x, y, and z directions. Instead of, or along with, controlling movement of the stage 14 in the x-y plane, the microscope 12 itself may be moved in the x-y plane. In this alternative embodiment, the microscope translational motion is controlled or its position is determinable to the same degree of accuracy and with substantially the same positioning apparatus as the stage 14.

When x, y control 16 is configured to operate in a closed-loop fashion, position feedback information can be recovered from the motor itself, or from optical position encoders or laser interferometer position encoders, if enhanced precision is desired. Closed-loop servo control of stage motion allows the stage position to be determined with great accuracy and insures that translation commands are responded to with high precision, as is well understood by those having skill in the motion control arts. Thus, a command to translate the stage 50 microns in the positive x direction will result in the stage 14 moving precisely 50 microns in +x direction, at least to the mechanical resolution limits of the motor system.

If the microscopy system is configured to operate in a semi-closed-loop or open-loop fashion, stage control is not dependent on feedback per se, but it is at least necessary to precisely define where the motors controlling the stage were told to go. For example, typical stepper motors will provide translational motion as a series of "steps" depending on a "direction" and "number of steps" command. So long as the translational movement per "step" is calibrated (or is otherwise determined or known) a movement command will result in the stage moving a known (or computed) distance, in the commanded direction. It only remains to save a record of the motion commands, along with a starting point, in order to determine the "present position" of the microscope stage.

A camera system 11 includes a main camera 22 and control electronics 24 as depicted in the exemplary embodiment of FIG. 1. Although a single main camera 22 is depicted, a plurality of main cameras may be suitably provided, as discussed in greater detail below. Position encoders may be coupled to the stage motors, or to the stage itself, and are adapted to transmit signals indicating the position of stage 14 to either the main camera 22, or its control electronics 24. This arrangement enables the camera(s) to capture images at desired predetermined positions, even while stage 14 is in continuous motion. For example, the position encoders may monitor the distance traversed by stage 14 (or movement commands, in the case of an open loop or semi-closed loop system) and transmit a predetermined signal every 5 microns of stage travel. Main camera 22 may be configured to capture an image in response to a set or a subset of such electrical signals received from the positioning feedback devices, which may be rotary or linear scale encoders, for example, thereby producing images of a microscope slide at regular intervals.

In one particular example, a linear encoder, mounted along the scan axis of the slide provides absolute positioning feedback to the control system to generate accurate periodic signals for image capture. These periodic signals act as external triggers to the camera for high speed consistent sectional image capture. This exemplary embodiment overcomes many positioning error issues, such as following errors (the difference of position from the electrically commanded position to the actual mechanical response of the positioning system to the commanded position) associated with the true transformation of electrical control signals to the actual mechanical position of the slide relative to the image plane of the camera. This exemplary embodiment may also safeguard against the periodic degradation of the mechanical hardware caused by the repeated use of lead screws, loose couplings, friction, environmental issues, and the like.

Alternatively, the main camera 22 may be configured to capture images at regular time intervals, or based on pulses transmitted to the motors. For example, control pulses sent to a stepper or a linear motor may be used. These could be raw transistor-transistor logic (TTL) signal pulses or amplified control pulses fed through an electronic counter circuitry generating an absolute or relative output pulse to trigger the camera for image capture, for example. A TTL step and direct signal, generated through a stepper controller pulse generator, as described above, may be fed back through the encoder feedback channel to the controller. In this arrangement, the integrated real time 'pulse counter' counts pulses to generate a periodic pulsed output for the camera. This technique may be used in conjunction with motor directional signal output as an input to the controller for bi-directional or uni-directional output trigger pulse control to capture images based on the direction of motion. Alternatively, clockwise and counter-clockwise operating modes may be used for motor control and to feed the directional pulses back to the controller for periodic camera triggering synchronized with motion.

In one aspect of the invention, focusing is performed by causing small excursions of the stage 14, in the z direction, under control of corresponding z control circuitry 17. Because the amount of relative motion during focusing is significantly smaller than the amount of relative motion during gross z translational movements, the focus circuitry 17 may comprise a micro-stepping motor controlled by appropriate motor driver circuitry which operates in parallel with a z axis stage translation motor. The z axis stage translation motor could, therefore, be provided with a more gross response characteristic such that it would be able to accommodate vertical optical sectioning of a specimen, i.e., viewing a specimen on various horizontal planes vertically disposed therethrough, while the focusing motor accommodates the micro-motions required to adequately focus each image plane.

In an alternative embodiment, focusing may be performed by causing small excursions of the objective turret 18 in the z direction, under control of focus/objective control system 15.

For example, a piezo transducer may perform focusing by causing small excursions of objective turret 18 and its corresponding objective lens(es) 19 in the z direction in response to signals received from a piezo amplifier.

Main camera 22 is preferably a high resolution, color, digital camera operating at a high-resolution and a high data rate. In the exemplary embodiment, a JAI CV-M7CL+ camera is contemplated for use, however, other cameras of comparable quality and resolution may also be used within the scope of the invention. Images captured by main camera 22 are directed via control electronics 24, such as a cameralink card, to control processor 20. As is well known by those having skill in the art, a cameralink card interfaces with digital cameras supporting the particular protocol and physical interface. Other protocols and physical interfaces are also contemplated in the context of the invention, and the particular interface described is not to be taken as limiting in any way.

The control processor 20, which may be implemented as a small platform computer system, such as an IBM-type x86 personal computer system, provides the data processing and platform capabilities for hosting an application software program suitable for developing the necessary command and control signals for operating the microscope system. Control processor 20 includes specialized software or circuitry capable of performing image processing functions. For example, control processor 20 may perform image analysis and obtain measurements of contrast, entropy, sharpness, etc. Control processor 20 may also contain specialized software or circuitry capable of manipulating and combining digital images. The control processor 20 is able to receive and interpret commands issued by a system user on a conventional input device, such as a mouse or a keyboard, and is further able to convert user defined commands into signals appropriate for manipulating the various components of the microscope system.

The control processor 20 is typically coupled to the microscopy system 100 through an interface (not shown), such as a serial interface, a Peripheral Component Interconnect (PCI) interface, or anyone of a number of alternative coupling interfaces, which, in turn, defines a system interface to which the various control electronics operating the microscope system are connected.

Many of the existing techniques used for capturing magnified images of a microscope slide, guide a scanning objective lens based on focus information that is obtained prior to the scanning operation and stored in a focal map, for example. In some cases, such focus information is quite inaccurate due to intra-field variations present on the surface of the sample, for example. Even when the focus information is accurate, the mechanical nature of the microscope apparatus can cause the scan to produce an out-of-focus image due to mechanical irregularities, such as small motions or vibrations of the apparatus, incorrect calibration, or the like.

The present invention provides an improved system and method for obtaining images of a microscope slide. In one aspect of the invention, multiple regions of a microscope slide are defined, multiple "candidate" images of each region are captured, and, for each region, an image having a desired focus quality is selected. The selected images are merged to generate a virtual slide. Capturing multiple images of a respective region on the microscope slide to produce a set of "candidate" images compensates for uncertainty associated with focus information determined a priori for the region.

Figure 5:
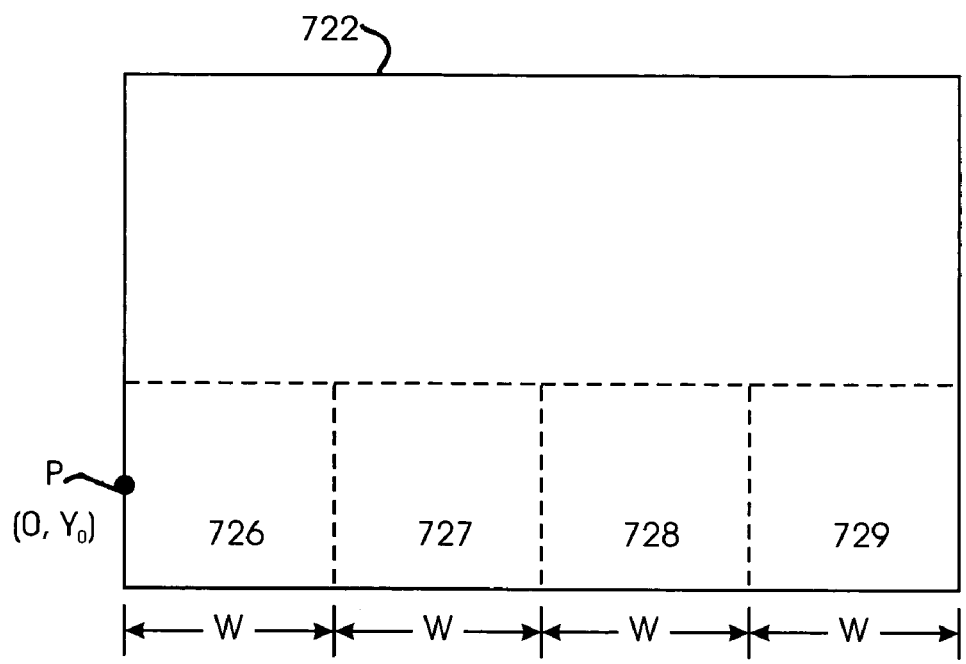
FIG. 5 is an example of a top view of a microscope slide on which four regions are defined, in accordance with an embodiment.

FIG. 2 is a flowchart of an exemplary method for generating images of a microscope slide, in accordance with principles of the invention. The microscope slide, containing a sample for which one or more magnified images are desired, is placed on a microscope stage. Referring to FIG. 1, the microscope slide 21 may be placed on robotically controlled sample stage 14 of microscope portion 10. At Step 410, multiple regions are defined on the microscope slide, as shown in FIG. 5 and described further below. If a virtual slide representing the entire microscope slide 21 is desired, the entire slide is divided into regions. Alternatively, a selected portion (or portions) of the microscope slide 21, containing one or more areas of interest, may be divided into regions. In one embodiment, the microscope slide may be divided into regions having the same dimensions as the field of view of the microscope objective lens; however, in other embodiments, regions may be defined to have other dimensions.

At Step 420, for each region, multiple images, each representing a different z-position of the microscope objective, are captured. In one exemplary embodiment, for each region, a first image representing a first z position, and a second image representing a second z-position, may be generated. In other exemplary embodiments, images representing more than two z-positions may be captured. Z-position may be controlled by adjusting the z-position of computer-controlled stage 14; alternatively, z position may be controlled by adjusting the position of the objective turret 18 and objective lens 19. In alternative embodiments, other methods for controlling z-position may be employed.

At Step 430, the images associated with each region are examined, and, at step 440, an image having a desired focus quality is selected for each region. The image may be selected by the control processor 20 or by an operator, for example. The selected images constitute a set of images covering the desired portion(s) of the microscope slide. At step 450, the selected images are merged to create a virtual slide.

Area Sensor

In one example, an area sensor may be employed with a single-camera apparatus, such as that shown in FIG. 1, to obtain images of a microscope slide. For example, camera 22 may contain an area sensor. In this embodiment, multiple regions on a microscope slide are defined. A plurality of z-positions are determined, and the microscope slide is scanned from each z-position. During each scan, at least one image of each defined region is obtained. As a result, multiple images of each defined region are generated (each image representing a different z-position). For each region, the associated set of images is examined and an image having a desired focus quality is selected. The selected images are combined to generate a virtual slide.

For example, two z-positions may be selected and the microscope slide 21 may be scanned at various x-positions across at least a portion of the slide from each z-position. These z-positions may be selected using a variety of techniques. For example, the first z-position may be based on the estimated in-focus z-position from a focus map, plus a fixed offset. The second z position may be based on the estimated in-focus z-position from the focus map, minus a second fixed offset. The second fixed offset may or may not be equal to the first fixed offset.

The offsets may be selected in several ways. In one case, the offsets may be a percentage of the depth of field of the scanning objective 19. For example, if the scanning objective 19 has a depth of field of 2 microns, the offset may be 50% of the depth of field (1 micron). A larger percentage may be used if the accuracy of the estimated focus position is deemed to be low. In that case, 80% of the depth of field could be used, for example.

As mentioned above, the value the offsets may be different. They may depend on the likelihood of error in focus in each direction, for example. If the errors are more likely in the negative z direction than the positive z direction, then the offset for z may be 50% and 80% of the depth of field of the scanning objective for offset-1 and offset-2, respectively.

FIG. 3 is a flowchart of an example of a method for using an area sensor to obtain images of a microscope slide, in accordance with the invention. A microscope slide (such as slide 21, of FIG. 1) containing a sample for which one or more magnified images are desired, is placed on a microscope stage, such as on robotically controlled sample stage 14 of microscopy system 100. At Step 505, multiple regions on the slide are defined. Generally, it is preferable to define regions to be as large as possible while avoiding intra-region focus variations. In one embodiment, regions are defined empirically; however, other approaches may be used. In an illustrative embodiment, the microscope slide 21 may be divided into regions having dimensions corresponding to the field of view of the microscope objective lens 19 (a selected one of objective lenses 19, for example); however, in other embodiments, regions may be defined to have other dimensions.

At Step 510, a first scan of the microscope slide is performed from a first z-position z1, and camera 22 captures a first image of each defined region on the slide. At Step 520, the defined regions on the microscope slide are scanned from a second z-position z2 and camera 22 captures a second image of each defined region. In this particular embodiment, z-positions z1 and z2 are selected from a predetermined optimum focal position, such as a desired-focus position value stored in a focal map with offsets applied as previously described. For example, the focus map may indicate that a z-position of 30 µm (micrometers or microns) is the best in-focus z-position. A first offset of 1 micron may be added to this focus map z position such that it is equal to 31 (z1=focus map z position+offset1=30+1=31). A second offset of 0.9 microns may be subtracted from the focus map z-position to produce the value for z2 equal to 29.1 (z2=focus map z position−offset2=30−0.9=29.1). It should be additionally noted that, while in this example the defined regions on the slide are scanned from two z-positions, in alternative embodiments, the slide may be scanned from any number of (but at least two) z-positions.

A set of images of a respective defined region (each image representing a different z position) is referred to as a "stack" of images. In one example, each stack comprises only two images—a first image and a second image of the associated region. However, in other embodiments, a stack may comprise more than two images of a particular region. For example, the microscope slide may be scanned from three, four, or more z-positions, resulting in stacks comprising as many images as the number of z-positions scanned from.

At Step 530, control processor 20 examines the first and second images associated with each defined region on the microscope slide. At Step 560, an image of each region having a desired focus quality is selected. Values of focus quality may be obtained using a variety of techniques known in the art. In one embodiment, one or more image processing techniques may be applied to each image in a stack to obtain, from each image, one or more measurements of focus quality. By way of example, a measure of overall entropy may be obtained for each micro image and used as a measure of focus quality. A measure of overall entropy for a micro-image may be obtained by compressing an image and measuring the volume of data in the compressed image, for example. In another example, a measure of texture energy may be obtained for each respective micro-image to obtain a value representing the focus quality of the image. In yet another example, a contrast measurement may be obtained for each respective image.

Alternatively, edge detection techniques may be applied to an image to obtain a value for sharpness. Other values relating to focus quality may also be measured. The measurements of focus quality thus obtained are analyzed to determine a desired-focus value for each region. For example, in one embodiment, the stack of images associated with a region is examined, an image having a maximum texture energy measurement is selected as the desired image, and a z-position associated with the desired image is selected as the desired focus value. Alternatively, a curve fitting algorithm may be applied to the various measurements of focus quality pertaining to a respective micro-region and a desired-focus value for the region may be estimated. Other estimation techniques may also be used.

The set of images selected at Step 560 (one image for each defined region) constitutes a collection of images depicting each of the defined regions at a desired focus quality. At Step 570, control processor 20 merges the selected images to generate a virtual slide. Any one of a number of known techniques may be used to combine the selected images to produce a virtual slide, such as stitching software.

In an additional exemplary embodiment, each defined region on the microscope slide may be further divided (or sub-divided) into micro-regions. For example, in the illustrative embodiment discussed above, each defined region on the microscope slide may be divided into four "micro-regions," for example. Similarly, the first and second z-position images associated with each respective region are divided into four micro-images corresponding to the micro-regions on the slide. A set of z-position micro-images corresponding to a respective micro-region on the microscope slide is referred to as a stack of micro-images.

In the illustrative example given above, each stack would suitably include two z-position micro-images. Accordingly, for each defined micro-region on the microscope slide, the corresponding stack of micro-images is examined, and a micro-image having a desired focus quality is selected. Selected micro-images are merged to create a virtual slide representing the defined regions.

It should be noted that although, in this particular example, each defined region is divided into four micro-regions, in other embodiments, the defined regions on the microscope slide may be divided into less than four, or more than four, micro-regions, and the images of each defined region may similarly be divided into a corresponding number of micro-images. The actual number of micro-regions and associated micro-images is not, therefore, to be taken as limiting, but rather as illustrating the operation of the methodology of the invention.

Using Interframe Capture Interval

During scanning, the mechanical nature of a microscope apparatus imposes an upper limit on the image capture rate. Because the microscope objective lens 19 (or, in some embodiments, the microscope stage 14) must physically move from one region to another during a scanning operation, a delay typically occurs after an image of one region is captured and before an image of the next region can be captured. The delay associated with this mechanical motion is referred to as the "interframe capture interval" and is associated with the mechanical and operational characteristics of a particular microscope apparatus.

In an aspect of the invention, one or more images of the microscope slide 14 are captured during the interframe capture interval, thereby increasing the rate of image capture. In one example, an image is captured of a first defined region from a first x-position and z-position. Before an image of a second defined region is captured at the second x-position, the microscope objective lens 19 must be adjusted to that second x-position. As the x-position of the objective lens 19 is adjusted, the z-position of the microscope objective lens is also adjusted to a second z-position and an image is captured of a desired area on the slide 14 from the second z-position, during the interframe capture interval, before the second x-position is reached.

The image captured from the second z-position may include portions of the first and/or the second regions, in what might be termed a quasi-overlapping fashion. After the image is captured from the second z-position, the adjustment to the next x-position of the objective lens 19 proceeds until the objective lens is positioned over the second defined region. Meanwhile, the z-position of the objective lens 19 is re-adjusted to the first z-position and an image of the second defined region is captured. It should be noted that although, in this discussion, both the z-position and the x-position are adjusted by changing the position of the microscope objective turret 18 and objective lens 19, the z-position and x-position may be adjusted by moving the microscope slide 21, or by other methods.

The technique outlined above may be implemented repeatedly to obtain, for multiple regions on a microscope slide 21, a first image of each region from a first z-position and a second image of each region from a second z-position. In this regard, FIG. 4 is an illustrative flowchart of an example of a method for using an interframe capture interval to capture images of multiple regions on a microscope slide, in accord with principles of the invention.

Figure 4:
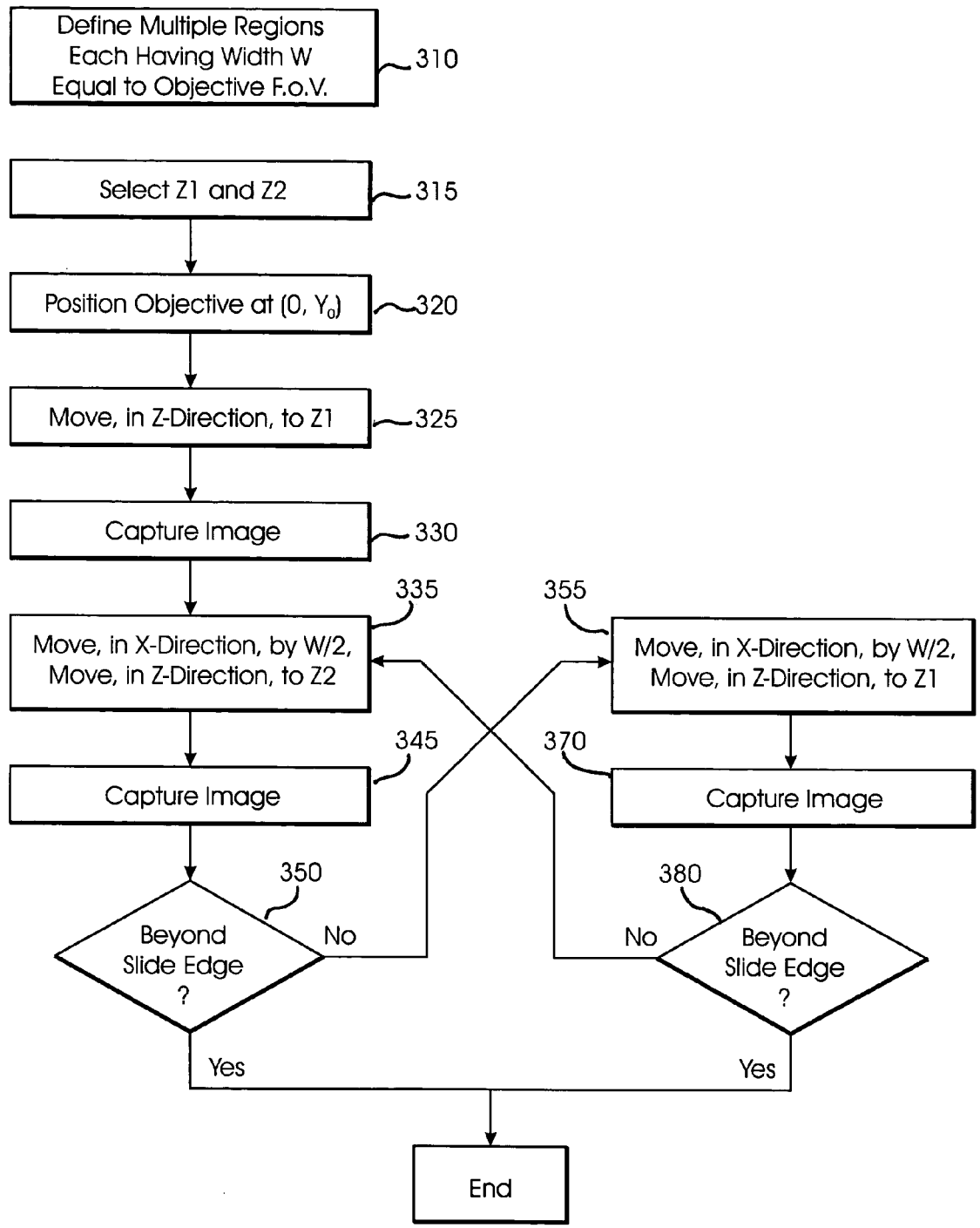
FIG. 4 is a flowchart of an example of a method for using an inter-frame capture interval to capture images of a microscope slide, in accordance with an embodiment.

In FIG. 4, at Step 310, multiple regions are defined on the microscope slide. In this example, each of the regions is defined to have the same dimensions as the field of view of the microscope objective lens 19. In particular, each region has a width (in the x-direction) equal to the width W of the field of view of the objective lens 19. By way of illustration, FIG. 5 illustrates a top, plan view of an exemplary microscope slide 722 on which four regions 726-729 are defined. As illustrated, regions 726-729 exhibit widths W (in the x-direction).

Referring again to FIG. 4, at Step 315, two z-positions z1 and z2 are selected. In one example, z1 and z2 are selected based on a predetermined optimum focal position. These z-positions may be selected using a variety of techniques, as previously described above. One selection method might employ the estimated in-focus z-position from a focus map plus a fixed offset for the first z position and the estimated in-focus z position from the focus map minus a second fixed offset for the second z position. At Step 320, processor 20 causes the x:y position of the microscope objective turret 18 and selected objective lens 19 to be adjusted to position the objective lens 19 above a point (0, y0) located on a first edge of the microscope slide. In this example, the y-value y0 may be selected to represent the midpoint of an edge of a selected one of the defined regions on the microscope slide. Referring to the illustrative example of the slide depicted in FIG. 5, the microscope objective lens 19 is positioned over point P, which in this instance is located at the midpoint of an edge of region 726.

Figure 6:
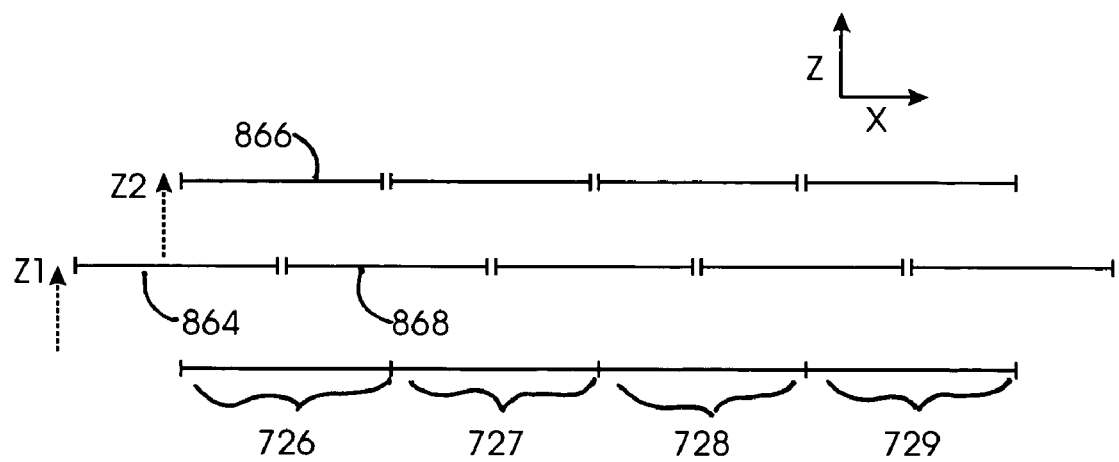
FIG. 6 is a cross-sectional view of a microscope slide and several positions from which a microscope objective lens may capture images of the slide, in accordance with an embodiment.

At Step 325, control processor 20 causes the microscope objective lens 19 to be moved along the z-axis to z-position z1. It should be noted that in this position, one-half of the field of view of the objective lens 19 captures a portion of defined region 726 on the microscope slide 722, and the other half of the field of view of the objective lens captures an area beyond the edge of the slide. This initial position of the microscope objective lens 19 is represented by position 864 in FIG. 6, which illustrates a cross-sectional view of microscope slide 722 and several positions from which a microscope objective may capture images of the slide. At step 330, camera 22 captures an image.

In accordance with this particular embodiment, the microscope objective lens 19 is moved along the x-axis toward the opposite edge (the "second edge") of microscope slide 722, passing over each defined region in turn. Meanwhile, the z-position of the microscope objective lens 19 alternates between z1 and z2, resulting in a zig-zag motion such as that shown in FIG. 6. This motion allows the microscope objective to capture a complete image of each defined region from z-position z2 (from position 866, for example), and, in addition, to capture from z-position z1 images covering portions of multiple regions (from positions 864, 868, for example). Accordingly, at Step 335 (starting from position 864), the x-coordinate of the microscope objective lens 19 is adjusted by +(W/2) i.e., in the positive direction by one half the width of a region, and the microscope objective lens is also moved along the z-axis to z2. Preferably, the movement of the objective lens 19 along the x-axis and its movement along the z-axis are performed in an integrated fashion such that the objective lens 19 moves smoothly from position 864 to position 866. The resulting position is represented, for example, by position 866 in FIG. 6. The field of view of the microscope objective lens 19 now captures defined region 726 in its entirety. At Step 345 (of FIG. 4), the image is captured. As indicated by block 350, if the center of the field of view of the microscope objective lens 19 is located beyond the second edge of the microscope slide 722, the routine comes to an end. In this instance, the objective has not yet reached the second edge of the microscope slide; therefore, the routine proceeds to Step 355.

At Step 355, the x-coordinate of the microscope objective lens 19 is again adjusted by +(W/2), and the z-coordinate of the microscope objective lens is adjusted to z1. The resulting position of the microscope objective lens 19 is represented by position 868 shown in FIG. 6, for example. In this position, the field of view of the microscope objective lens captures portions of regions 726 and 727. At Step 370, an image is again captured. As indicated by block 380, if the center of the field of view of the microscope objective lens 19 is located beyond the second edge of microscope slide 722, the routine comes to an end, otherwise the routine returns to Step 335, and additional images are obtained. The routine can be repeated multiple times for multiple scan rows if the area of interest requires more than one scan row. While the illustrative slide 722 of FIG. 5 depicts one scan row, it will be well understood by those having skill in the art that it may comprise multiple rows, as well.

The routine described above and outlined in FIG. 4, referred to as the "zig-zag technique," produces a set of images containing two images of every point in defined regions 726-729, including one image of the point captured from z-position z1, and a second image of the point captured from z-position z2. In one example, the images captured from z-position z2 (from position 866, for example) correspond to the defined regions 726-729. The images captured from z-position z1 (from positions 864, 868, for example) do not correspond to the defined regions; however, processor 20 may apply image processing techniques (software registration, for example) to these images to produce images corresponding to regions 726-729. Processor 20 examines the resulting images of each defined region, and, for each region, selects an image having a desired focus quality, in a manner similar to those described above. The selected images are subsequently merged to create a virtual slide.

It will be appreciated by those having skill in the art that the above routine may, as previously described, use the estimated in-focus z-position from a focus map plus a fixed offset for the first z1 position. The second, z2 position, could be computed as the estimated in-focus z-position from a focus map minus a second fixed offset that may or may not have the same value as the first fixed offset. In accordance with this method for determining z1 and z2, the actual values for z1 and z2 may change with each movement of the objective turret 18 and the objective lens 19, while the offsets may remain the same. This occurs since the estimated in-focus z-position may change with each x:y coordinate position in accordance with the focus map's predicted best in-focus z-position for that x:y coordinate. Referring once again to FIG. 4, at Step 315, z1 and z2 would initially be computed. Then, at Step 335, z1 and z2 would be recomputed utilizing the estimated in-focus z-position for the x:y position (W/2, y0). The values for z1 and z2 would also be recomputed at Step 355 where the subsequent x:y position would be (W, y0). The process of recomputing z1 and z2 would necessarily continue with each change in x:y position.

It should be noted that the methodologies described above and represented in FIGS. 4-6 represent only certain exemplary embodiments of the use of the zig-zag technique to scan a microscope slide. In other examples, the microscope objective lens 19 may follow other paths. For example, a third z-position, z3, can be defined as an intermediary position falling between z1 and z2, or as a firm third position falling above z2, or below z1. As a result of the additional z-position, the amount by which the x-coordinate of the microscope objective lens is adjusted, would be varied. An example of such a change would be the use of step sizes of W/3 instead of W/2. This would result in adjustment to the x-coordinate at each step changing, such as +(W/3) at Step 335 and +(W/3) at Step 355. Concurrently, at Step 355 the z move would be to position z3 rather than to z1. After Step 380 but before a repetition of Step 335, there would be an additional step comprising moving microscope objective in the x-direction by +(W/3) and in z-direction to z1.

The result of this addition would be images from three focal planes. Numerous benefits may be obtained by having images from three focal planes instead of two, such as the ability to add estimation about the optimum z-position for capturing the best focusing imaged. With focus information from three images, complex curve fitting techniques, such as a Gaussian curve fit, can be implemented. The curve fit would then predict the z-position for best absolute focus. If this z-position did not include any of the three z-positions actually captured, the predicted best focus could then be used by software to determine if a rescan of the row is necessary. This rescan could then use the predicted focus for determining new optimal z position values for z1, z2 and z3 such that the predicted best focus image would be captured by at least one of the images z1, z2, and z3.

Area Sensor: Multiple Cameras

Figure 7:
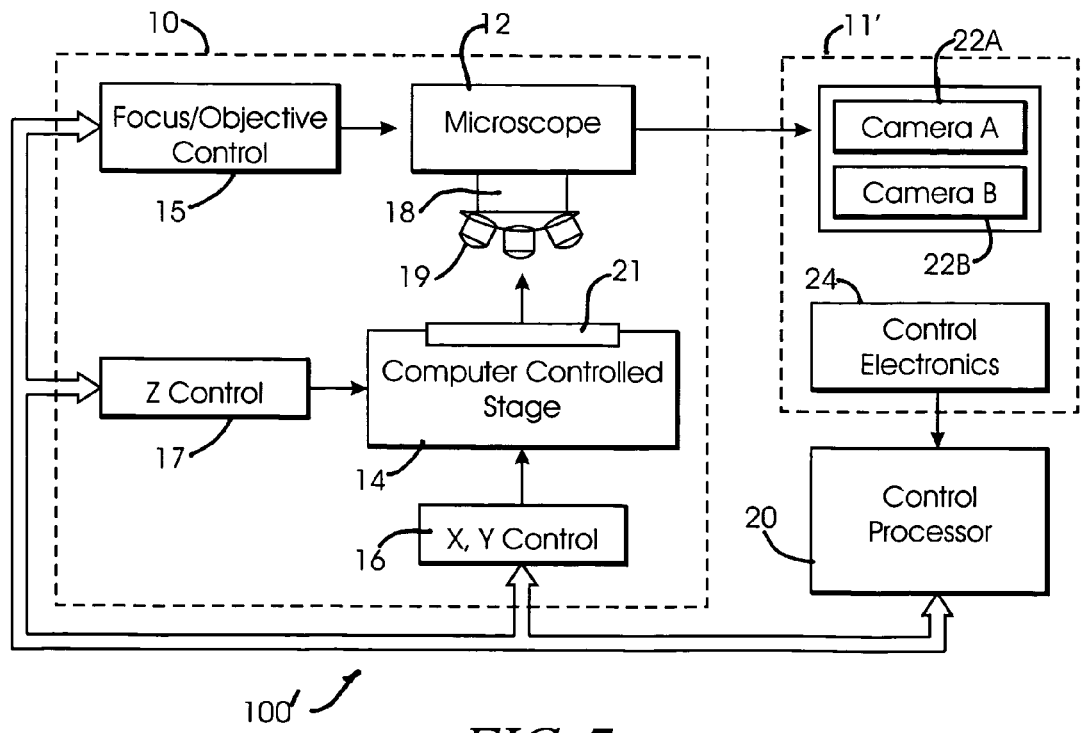
FIG. 7 is a block diagram of a dual-camera imaging system that may be used to obtain images of a microscope slide, in accordance with an embodiment.

In an alternative embodiment of the invention, area sensors may be used in a multiple-camera apparatus to simultaneously or sequentially capture images of one or more defined regions on a microscope slide. Using multiple cameras may increase the image capture rate for a given number of defined regions on a microscope slide. In this regard, FIG. 7 is a simplified block diagram of a dual-camera microscopy imaging system 100' that may be used to obtain images of a microscope slide 21, in accordance with the present invention, wherein the camera system 11' suitably comprises two cameras 22A and 22B. Other components of FIG. 7, common to the microscopy system 100 of FIG. 1 are commonly numbered for convenience of reference.

Each of the two cameras 22A and 22B includes an area sensor. Cameras 22A and 22B are configured to simultaneously capture multiple images of a respective region on a microscope slide 21 in a single scan pass. In one particular example, cameras 22A and 22B are positioned at different distances from the objective lens 19 of microscope 12. Accordingly, when cameras 22A and 22B pass over a respective defined region on the microscope slide 21, two images of the region are captured, each associated with a different focal plane. It should be noted that in alternative embodiments, more than two cameras may be employed. It is a relatively simple matter to divide the optical image seen by an objective into multiple paths and direct each path to a corresponding camera. Necessarily, each camera would be positioned at a different, but well known or calibrated focal distance from the slide (or objective), such that the difference in camera positioning would result in an effective focal distance (or z-position) difference.

FIG. 8 is a flowchart of an example of a method for using a multiple-camera apparatus, as in FIG. 7, to obtain images of a microscope slide, in accordance with the invention. At Step 805, multiple regions on the microscope slide are defined, as described above in connection with prior exemplary embodiments. At Step 820, a scan of the microscope slide is performed. Because camera 22A and camera 22B are positioned at different distances from the objective lens 19, the scan produces two different images of each defined region.

At Step 830, for each defined region on the microscope slide, the two images are examined for focus quality as was described previously. An image having a desired focus quality is selected, in Step 860. At Step 870, the selected images are merged to generate a virtual slide.

In an alternative embodiment, the zig-zag technique, described with reference to FIG. 4, may be employed with the dual-camera imaging system 100' shown in FIG. 7, in order to increase the image capture rate and obtain a greater number of images during each scan of the microscope slide 21. In this example, two z-positions may be selected for each camera and the zig-zag technique may be utilized to generate four images of each defined region in a single scan operation.

In yet another example, cameras 22A and 22B may each be positioned at the same distance from the objective lens, but offset in a translational direction (typically offset in the x-direction) a known or calibrated amount. In this case, image captures are performed alternately by cameras 22A and 22B, making it possible to move the microscope apparatus at a higher scan speed.

Multi Plane Focal Surface

In yet another embodiment, multiple regions are defined on a microscope slide and a focal surface containing one or more desired-focus values for each defined region is generated. For each defined region, multiple z-positions are selected based on the desired-focus values stored in the focal surface. One or more images of each region are captured from each of the associated z-positions, and an image of each region having a desired focus quality is selected. The selected images are merged to create a virtual slide.

FIG. 9 is a flowchart of an example of a method for using a focal surface to generate images of a microscope slide, in accordance with this particular embodiment. At Step 1010, multiple regions are defined on a microscope slide, as previously described. At Step 1020, a focal surface containing one or more desired-focus values for each of the defined regions, is generated. A desired-focus value represents a z-position from which a given microscope objective may capture an in-focus image of a respective region on the microscope slide. In one example, the focal surface may be generated using a first microscope objective lens 19 having a first magnification, such as 4×, and scanning (described in Step 1040 below) may be performed using a second microscope objective lens 19 having a second magnification, such as 20×. In this embodiment, the focal surface is adjusted prior to scanning based on characteristics of the second microscope objective.

Referring again to FIG. 9, at Step 1030, the control processor 20 uses the information contained in the focal surface to determine multiple z-positions for each defined region, each representing a z-position from which an image of the region is to be captured. For example, three z-positions may be selected for each defined region: a first z-position equal to the desired-focus value indicated in the focal surface, a second z-position equal to the desired-focus value plus a predetermined offset, and a third z-position equal to the desired-focus value minus the predetermined offset. At Step 1040, the defined regions are scanned multiple times, once from each of the selected z-positions, to produce multiple images of each region. In the illustrated embodiment described above, scanning is performed using a second microscope objective 19 having a second magnification which is preferably higher than the first magnification. At Step 1050, processor 20 examines the images corresponding to each respective region for image quality. An image of each region, having a desired focus quality, is then selected in Step 1060. Processor 20 merges the selected images to generate a virtual slide, in Step 1070.

Line Sensor

Figure 10:
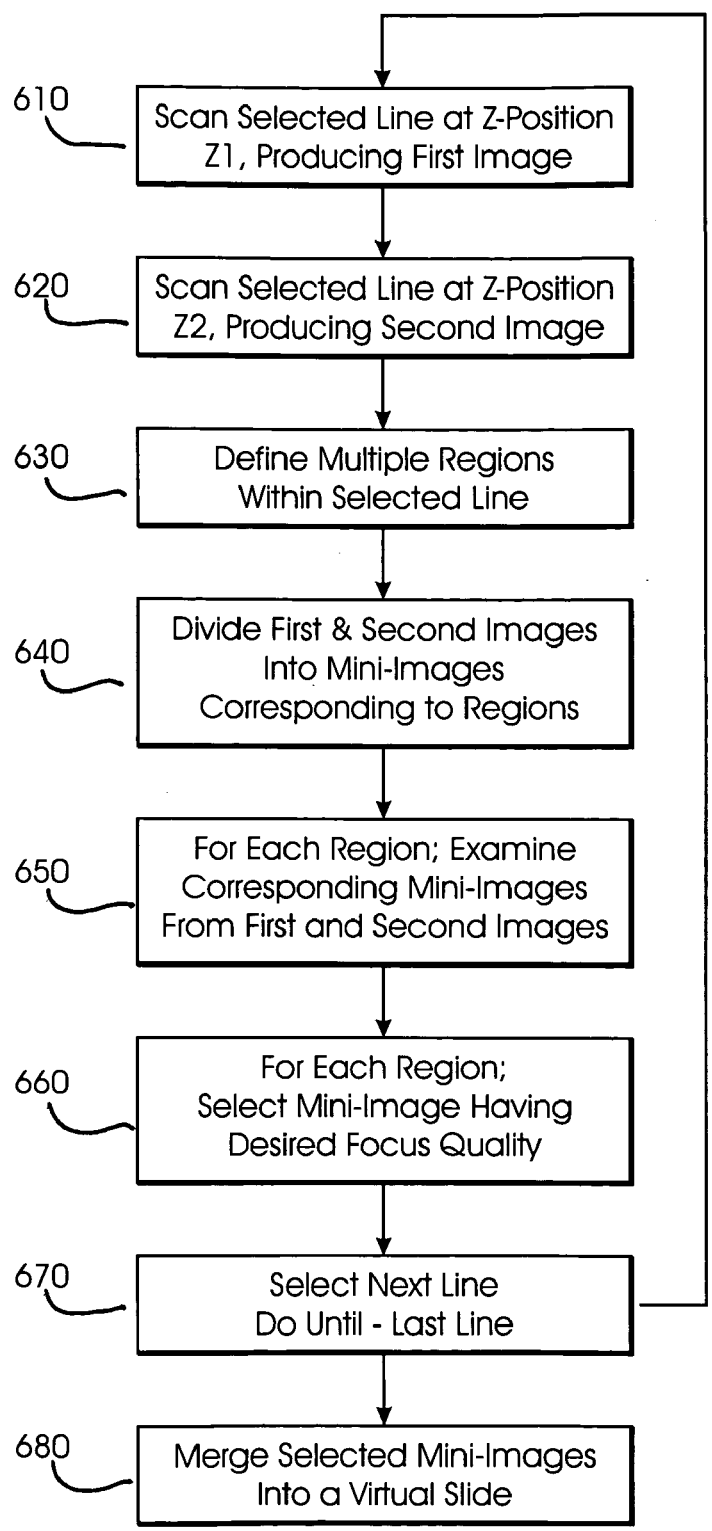
FIG. 10 is a flowchart of an example of a method for using a line sensor to obtain images of a microscope slide, in accordance with an embodiment.

In yet another alternative embodiment, a camera 22 containing a line sensor, which detects image information along only one dimension, may be employed to obtain images of a microscope slide 21, in accord with the exemplary microscopy system 100 of FIG. 1. In this regard, FIG. 10 is a exemplary flowchart of a method for using a line sensor to obtain images of a microscope slide, in accordance with this alternative exemplary embodiment. At Step 610, a selected line on the microscope slide is scanned from a first z-position z1, producing a first image of the line. At Step 620, the selected line is scanned from a second z-position z2, producing a second image of the line.

At Step 630, multiple regions within the line are defined. Generally, it is preferable to define regions to be as large as possible while avoiding intra-region focus variations. In one embodiment, regions are defined empirically. At Step 640, the first image and the second image are divided into mini-images corresponding to the defined regions of the line. A set of mini-images corresponding to a respective region of the line is referred to as a "stack" of mini-images. At Step 650, for each defined region of the line, the corresponding stack of mini-images is examined and, at Step 660, a mini-image having a desired focus quality is selected. As indicated by block 670, Step 610 may be repeated one or more times to obtain magnified images of all or a portion of the microscope slide. The selected mini-images are merged to generate a virtual slide in Step 680. It should also be understood that multiple line sensors may also be employed with a multiple-camera apparatus to increase the image capture rate. For example, the dual-camera system 100' of FIG. 7 may be used in combination with line sensors for further enhancement of the image capture rate.

The imaging systems of FIGS. 1 and 7 are disclosed herein in a form in which various functions are performed by discrete functional blocks. However, many of these functions could be embodied in an arrangement in which the functions of one or more of those blocks are realized, for example, by one or more appropriately programmed processors. Additionally, the various imaging systems and methodologies have been described in separate fashion, in order to clearly delineate certain novel features thereof. It should be understood by those having skill in the art that many of the techniques and apparatus may be combined and/or substituted for one another without impacting the utility of the invention. It should be further understood that the various motions and axes described above were described with axis notations of convenience and are not meant to imply specific directions or aspects in space. Translations of an objective lens might be implemented by stage motion, turret motion, or motion of the microscope head itself. How motion is accomplished is immaterial, so long as the motion is with respect to an index position on a slide and is characterizable, measurable and repeatable.

The foregoing, therefore, merely illustrates the principles of the invention. It will thus be appreciated that those skilled in the art will be able to devise numerous other arrangements which embody the principles of the invention and are thus within its spirit and scope. The embodiments described above and depicted in the figures are not meant to be limiting, but rather illustrative of the invention which is to be limited only by the appended claims.

The invention claimed is:

1. In a microscopy system for scanning physical sample slides, the physical slides moveable through a microscope optical field of view and focusable through a z position, a method for creating a digital, virtual slide having optimum image quality characteristics, the method comprising:
    defining multiple regions for each physical slide;
    defining at least two focus z positions z1, and z2;
    scanning the physical slide at the first z position, so as to produce a first set of digital images of each defined region;
    scanning the physical slide at a second z position, so as to produce a second set digital images of each defined region;
    evaluating each image of each set against a focus quality metric; and
    selecting, for each region, either the first or second image, corresponding to that region, having a focus quality metric corresponding to a desired focus quality.

2. The method according to claim 1, wherein the scanning steps are performed sequentially for each defined region, each region being imaged at the first z position z1 and then at the second z position z2.

3. The method according to claim 1, wherein the scanning steps are performed seriatim for all defined regions, all defined regions being imaged sequentially at the first z position z1 and then imaged sequentially at the second z position z2.

4. The method according to claim 1, wherein the z position focus defining step further comprises:
    determining a nominal in-focus z position for a sample slide;

adjusting the nominal z position, in a first direction, by a first z position off-set;

adjusting the nominal z position, in an opposite direction, by a second z position off-set; and defining the first and second adjusted z positions as said two focus z positions z1, and z2.

5. The method according to claim 4, wherein the nominal in-focus z position for a sample slide is determined from a focus map.

6. The method according to claim 4, wherein the first z position off-set is unequal to the second z position off-set.

7. The method according to claim 1, wherein the scanning steps are performed simultaneously for each defined region, each region being imaged at the first z position z1 and at the second z position z2 simultaneously.

8. The method according to claim 7, further comprising:
providing a plurality of digital imaging devices, the plurality coupled to the microscopy system so as to capture multiple images of the optical field of view, the images differing from one another by said focus z positions; and
simultaneously imaging a portion of the physical slide presented to the optical field of view.

9. The method according to claim 8, wherein each of the plurality of digital imaging devices captures an image of the same portion of the physical slide.

10. The method according to claim 8, wherein the field of view of each of the plurality of digital imaging devices is disposed along a translational direction such that each of the plurality of digital imaging devices captures an image of a next, sequential portion of the physical slide.

11. The method according to claim 10, wherein the microscopy system translates the physical slide along the field of view of the imaging devices a distance corresponding to a defined portion of an imaging device field of view.

12. The method according to claim 11, wherein an imaging device field of view has a width dimension W and the microscopy system translates the physical slide a distance W/2, so as to generate multiple sequential images overlapping one another by W/2.

13. In a microscopy system of the type in which physical material sample slides are supported for viewing and image capture, the physical slides moveable through a microscope optical field of view and focusable through a z position, a method for creating a digital, virtual slide having optimum image quality characteristics, the method comprising:

defining multiple regions for each physical slide;

scanning the physical slide at a first z position, so as to produce a first set of digital images of each defined region having a first focus quality metric;

scanning the physical slide at a second z position, so as to produce a second set digital images of each defined region having a second focus quality metric;

evaluating each image of each set against a focus quality metric;

selecting, for each region, either the first or second image, corresponding to that region, having a focus quality metric corresponding to a desired focus quality;

identifying the selected one of each set of images as the chosen image of a corresponding region; and merging the identified regional images into a composite image, the composite image defining the virtual slide.

14. The method according to claim 13, wherein the focus quality metric evaluation step is performed by application software residing on a control processor.

15. The method according to claim 14, wherein the focus quality metric evaluation is performed by measuring an image characteristic selected from the group consisting of overall image entropy, image texture energy, image contrast, and feature edge sharpness.

16. The method according to claim 13, further comprising:
determining a nominal in-focus z position for a sample slide;

adjusting the nominal z position, in a first direction, by a first z position off-set;

adjusting the nominal z position, in an opposite direction, by a second z position off-set; and defining the first and second adjusted z positions as said first and second z positions.

17. The method according to claim 16, wherein the nominal in-focus z position for a sample slide is determined from a focus map.

18. The method according to claim 16, wherein the first z position off-set is unequal to the second z position off-set.

19. The method according to claim 16, wherein the first and second z position off-sets are within a depth of field of an objective lens of the microscopy system.

20. In a microscopy system of the type in which physical material sample slides are supported for viewing and image capture, the physical slides moveable through a microscope optical field of view along x and y positions and focusable through a z position, a method for creating a digital, virtual slide having optimum image quality characteristics, the method comprising:

defining multiple regions for each physical slide;

moving the physical slide through the microscope optical field of view;

capturing, for each defined region, a set of images, each image of the set characterized by a different z position from other images of the set;

evaluating each image of each set against a focus quality metric;

selecting, for each region, a particular one of the set of images corresponding to that region having a focus quality metric corresponding to a desired focus quality;

identifying the selected ones of each set of images as the chosen image of a corresponding region; and merging the identified regional images into a composite image, the composite image defining the virtual slide.

21. In a microscopy system of the type in which physical material sample slides are supported for viewing and image capture, the physical slides moveable through a microscope optical field of view along x and y positions and focusable through a z position, a method for creating a digital, virtual slide having optimum image quality characteristics, the method comprising:

defining multiple regions for each physical slide, each region having an area characterized at least by a width dimension W;

capturing an image of a first defined region, wherein the microscope is positioned, relative to the physical slide, at a first z position z1;

moving the physical slide along a translational axis through the microscope optical field of view a distance equal to one-half a regional width dimension (W/2);

adjusting the position of the microscope to a second z position z2;

capturing an image of the physical slide so presented to the optical field of view;

moving the physical slide in the same direction along the translational axis through the microscope optical field of view a distance equal to one-half a regional width dimension (W/2);

returning the position of the microscope to the first z position z1;

capturing an image of a second defined region, wherein the microscope is positioned at the first z position z1; and repeating the steps of adjusting, capturing, moving W/2, returning, capturing and moving W/2.

22. The method according to claim 21, wherein the repetitive step produces a first set of images having a first focal position z1 and a second set of images having a second focal position z2, the first and second image set representing images of the defined regions having image boundaries offset from one another by W/2.

23. The method according to claim 22, further comprising:

evaluating each image of the first and second focal position sets set against a focus quality metric;

registration processing one of the first or second focal position image sets by an offset amount W/2 so as to make image boundaries congruent;

selecting a particular one of the first and second focal position images, corresponding to a defined region, having a focus quality metric corresponding to a desired focus quality;

identifying the selected ones of images as the chosen image of a corresponding region; and merging the identified regional images into a composite image, the composite image defining the virtual slide.

\* \* \* \* \*

UNITED STATES PATENT AND TRADEMARK OFFICE
CERTIFICATE OF CORRECTION

| | | |
|---|---|---|
| PATENT NO. | : 7,456,377 B2 | Page 1 of 1 |
| APPLICATION NO. | : 11/211405 | |
| DATED | : November 25, 2008 | |
| INVENTOR(S) | : Jack A. Zeineh et al. | |

It is certified that error appears in the above-identified patent and that said Letters Patent is hereby corrected as shown below:

Column 3, line 56, delete "images", insert --imaged--.

Column 5, line 48, delete "a".

Column 6, line 44, delete "robotic ally", insert --robotically--.

Column 10, line 58, delete "mayor" and insert -- may or--.

Signed and Sealed this

Fourteenth Day of December, 2010

David J. Kappos
*Director of the United States Patent and Trademark Office*